United States Patent
Heidenreich

[11] Patent Number: 6,019,199
[45] Date of Patent: Feb. 1, 2000

[54] HYDRAULIC CALIPER DISK BRAKE FOR STEEL MILL CRANES

[75] Inventor: David C. Heidenreich, Akron, Ohio

[73] Assignee: Power Transmission Technology, Inc., Sharon Center, Ohio

[21] Appl. No.: 08/858,888

[22] Filed: May 19, 1997

[51] Int. Cl.[7] ............................................. F16D 65/09
[52] U.S. Cl. .................. 188/73.34; 188/71.1; 188/71.8; 188/72.3; 188/72.4; 188/216; 188/370; 188/196 P; 188/196 M
[58] Field of Search ................................. 188/71.1, 71.8, 188/71.9, 72.3, 216, 370, 196 P, 72.4, 73.34, 73.33, 73.32, 72.5, 196 M, 196 V, 73.45, 205 R, 206 R, 171, 1.11 R, 1.11 W, 73.35–73.39; 92/130 B, 130 C, 85 A, 130 D, 135

[56] References Cited

U.S. PATENT DOCUMENTS

| | | | |
|---|---|---|---|
| 2,568,858 | 9/1951 | Kovac | 188/370 |
| 2,743,790 | 5/1956 | Bricken | 188/370 |
| 2,844,223 | 7/1958 | Runner | 188/71.8 |
| 2,866,526 | 12/1958 | Wiseman, Jr. | 188/71.8 |
| 2,888,103 | 5/1959 | Armstrong | 188/72.4 |
| 2,888,104 | 5/1959 | Frayer | 188/370 |
| 2,900,052 | 8/1959 | Frayer et al. | 188/196 P |
| 3,064,765 | 11/1962 | Dotto | 188/72.4 |
| 3,095,064 | 6/1963 | Tankersley et al. | 188/71.8 |
| 3,186,521 | 6/1965 | Chouings | 188/71.8 |
| 3,277,983 | 10/1966 | Jeffries | 188/72.3 |
| 3,338,354 | 8/1967 | Jeffries | 188/71.8 |
| 3,339,683 | 9/1967 | Burnett | 188/71.8 |
| 3,439,781 | 4/1969 | Ostwald | 188/196 P |
| 3,550,728 | 12/1970 | Seip et al. | 188/71.8 |
| 3,575,268 | 4/1971 | Kimata | 188/196 P |
| 3,890,884 | 6/1975 | Silberschlag | 188/72.4 |
| 3,964,692 | 6/1976 | Pendleton | 188/73.32 |
| 4,058,084 | 11/1977 | Kawaguchi et al. | 188/71.8 |
| 4,381,047 | 4/1983 | Gregoire et al. | 188/71.8 |
| 4,781,273 | 11/1988 | Fujinami | 188/73.42 |
| 5,307,730 | 5/1994 | Erwih | 188/72.3 |
| 5,582,277 | 12/1996 | Heidenreich et al. | 188/72.3 |

*Primary Examiner*—Douglas C. Butler
*Attorney, Agent, or Firm*—Renner, Kenner, Greive, Bobak, Taylor & Weber

[57] ABSTRACT

A hydraulic caliper disk brake (10) according to the present invention includes a caliper base (46) that is supported by a folding triangular base (14) that generally includes a mounting base (30) and a support arm (54). The caliper base (46) is pinned to the mounting base (30) and the support arm (54) such that the caliper base (46) may pivot about the mounting base (30) when the pin connecting the support arm (54) to the mounting base is removed. The configuration allows the caliper assembly (12) to be pivoted out, away from a brake disk (16) such that the friction pads (142, 242) may be easily replaced. The caliper assembly (12) includes a self-activating wear adjuster (172) that functions to maintain a constant brake gap (174) between an active friction pad (142) and the brake disk (16). The caliper assembly (12) also includes a wear indicator in the form of a spring (134) that provides additional force that is fed back to the user when the friction pad (142) is significantly worn. The caliper assembly (12) further includes a manual adjustment member (220) that allows a user to adjust the position of the passive friction pad (242).

13 Claims, 4 Drawing Sheets

HYDRAULIC CALIPER DISK BRAKE FOR STEEL MILL CRANES

TECHNICAL FIELD

The invention herein resides in the art of power transmission devices such as clutches and brakes. More particularly, the invention relates to a brake for employment with steel mill cranes. Specifically, the invention relates to a hydraulic caliper disk brake for steel mill cranes which is readily adapted for replacing hydraulic drum brakes previously employed for the same purpose.

BACKGROUND OF THE INVENTION

In the United States steel industry, direct current (DC) motors having drum-shoe brakes are predominately used for crane drives. Such drum-shoe brakes pose significant maintenance problems for the steel mills due to the necessity of frequent adjustments, the existence of thermal limitations, and the extreme difficulties encountered during servicing. Drum-shoe brakes are given to high wear rates, requiring frequent servicing and shoe replacement. Typically, these brakes are in areas which are difficult to access, being associated with cranes in elevated locations. Additionally, the brake shoes are both heavy and cumbersome. Furthermore, the prior art process of shoe replacement was a lengthy process that was frequently undertaken. One problem with replacing the drum brakes is that the position and area allotted for crane drive brakes is rather fixed, thus requiring the brake to fit into a defined and somewhat limited envelope. Accordingly, any improvement or modification to the brake system must necessarily be confined to that same envelope.

Crane travel drives typically employ hydraulic drum brakes that are controlled by a foot pedal. Springs must be provided such that when the pedal is released, it returns to its initial position. One disadvantage with this system is that the force of the springs must overcome back pressure in a check valve. Another disadvantage with the hydraulic drum brake system is the relatively large pedal stroke required to apply the brake. Such a large pedal stroke requires a large amount of hydraulic fluid to be pressurized and moved through the system. As such, more frequent adjustments are required to maintain the system in proper working order. Accordingly, it is desirable to devise a disk brake assembly in substantially the same general envelope as that employed by the prior art drum brake that has a shorter stroke and the capability to be easily serviced. It is also desirable to devise such a disk brake assembly which can accommodate the axial movement common in D.C. mill motors.

DISCLOSURE OF THE INVENTION

In light of the foregoing, it is a first aspect of the invention to provide a hydraulic caliper disk brake for steel mill cranes which may readily replace prior art drum-shoe brakes while fitting within the same general envelope as the prior drum-shoe brakes;

Another aspect of the invention is to provide a caliper disk brake for steel mill cranes which provides for ease of friction wear part replacement.

A further aspect of the invention is to provide a caliper disk brake for steel mill cranes which reduces the weight and bulk of the replacement wear parts.

Still a further aspect of the invention is to provide a caliper disk brake for steel mill cranes which provides for ease of brake adjustment.

Still another aspect of the invention is to provide a caliper disk brake for steel mill cranes which employs self-alignment features such that the brake requires minimal wear-in time.

An additional aspect of the invention is to provide a caliper disk brake for steel mill cranes in which a self-adjuster automatically adjusts the caliper assembly for wear on the friction pads.

Yet a further aspect of the invention is to provide a caliper disk brake for steel mill cranes which has an actuating cylinder displacement stroke that is relatively small.

Still a further aspect of the invention is to provide a caliper disk brake for steel mill cranes which may be retrofit using the existing hydraulic components of the previous drum brake system.

Another aspect of the invention is to provide a caliper disk brake for steel mill cranes which includes a spring that provides an indication to a user when the brake pads are close to wearing out.

A further aspect of the invention is to provide a caliper disk brake for steel mill cranes having a manual adjustment mechanism to further compensate for friction pad wear.

Yet a further aspect of the invention is to provide a caliper disk brake for steel mill cranes which includes the use of self-retracting seals that at least partially assist the piston in retracting when the brake is released.

Another aspect of the invention is to provide a caliper disk brake for steel mill cranes that includes a mounting configuration that may be quickly and easily unfolded so that the friction pads may be easily removed.

The foregoing and other aspects of the invention, which will become apparent as the detailed description proceeds, are achieved by a caliper disk brake, including a mounting base having a first end and a second end; a caliper assembly having a caliper base, the caliper base including an upper end and a lower end, the lower end of the caliper base pivotally connected to the first end of the mounting base; a support arm having an upper end and a lower end, the upper end of the support arm pivotally connect to the upper end of the caliper base, the lower end of the support arm pivotally connected to the second end of the mounting base; the caliper assembly including a pair of friction pads; a portion of the brake disk disposed between the friction pads when the lower end of the support arm is connected to the second end of the mounting base; the caliper assembly pivotable away from the brake disk when the lower end of the support arm is disconnected from the second end of the mounting base such that the friction pads are free of the brake disk.

Other aspects of the invention which will become apparent herein are achieved by a caliper assembly for a hydraulically applied caliper disk brake for use with crane travel devices carrying a brake disk, the caliper assembly including a caliper base; a piston slidably carried by the caliper base; and a spring carried by the piston such that the spring will eventually engage the base as the piston moves inwardly toward the brake disk;after the spring contacts the base, the spring being compressed as the piston moves further inwardly.

Further aspects of the invention are achieved by a caliper assembly for a hydraulically applied caliper disk brake for use with crane travel devices carrying a brake disk, the caliper assembly including a caliper base; a piston slidably carried by the caliper base; a friction pad carried by the piston adjacent the brake disk forming a brake gap between the friction pad and the brake disk; and a self-activating wear adjuster carried by the caliper base that maintains the brake gap as the friction pad wears by resetting the initial resting position of the piston when the friction pad wears.

BRIEF DESCRIPTION OF THE DRAWINGS

For a complete understanding of the objections, techniques and structure of the invention, reference should be made to the following detailed description and accompanying drawings wherein.

BEST MODE FOR CARRYING OUT THE INVENTION

Figure 1:
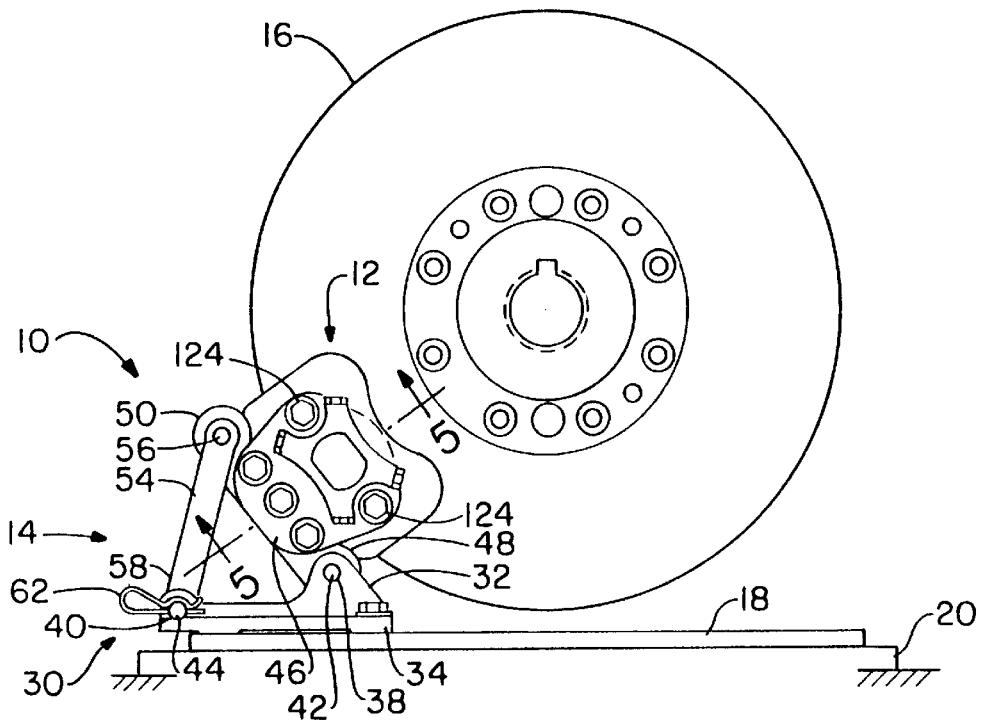
FIG. 1 is a side elevational view of a hydraulic caliper disk brake according to the present invention, mounted such that the brake acts on a single disk.

As can be seen in the drawings, a hydraulic caliper disk brake made in accordance with the concepts of the present invention is indicated generally by the numeral 10. The hydraulic caliper disk brake 10 generally includes a caliper assembly 12 that is supported by a folding triangular base 14. As may be seen in FIG. 1, the brake 10 is used in conjunction with a disk 16 to provide braking power. When the brake 10 is retrofitted into an existing device, an adapter plate 18 may be required to correctly position the brake 10 on a frame member 20 of the device. The adapter plate 18 includes a plurality of predrilled holes that are spaced to accept the folding triangular base 14 of the brake 10 and another set of predrilled holes to allow the adapter plate 18 to be mounted to the frame member 20.

The folding triangular base 14 generally includes a mounting base 30 that includes upright adjacent mounting plates 32 that extend upwardly from a flange 34 that provides bolt holes that correspond to the predrilled holes in the adapter plate 18. Thus, it can be seen that the mounting base 30 may be bolted to the adapter plate 18 or that the mounting base 30 may be directly bolted to the frame member 20 of a crane. Each mounting plate 32 has a first end with a first hole 38 and a second end with a second hole 40 therein configured to receive first and second pins 42, 44, respectfully.

The first pin 42 is used to connect a caliper base 46 to the mounting base 30 of the folding triangular base 14. The pinned connection allows the caliper base 46 to pivot with respect to the mounting base 30 about the pin 42 when a user desires to access brake 10. The caliper base 46 has a lower end 48 and an upper end 50. The lower end 48 is pinned to the mounting base 30 while the upper end 50 is pinned to an upper end 52 of a Y-shaped support arm 54 by a third pin 56. The lower end 58 of the support arm 54 is pinned to the mounting base 30 by the second pin 44. Thus, it can be understood that the combination of the mounting base 30, the caliper base 46, and the support arm 54 form a triangular configuration that is substantially rigid when the pins 42, 44, 56 are in place. The triangular configuration of the elements is said to be "folding" because the pinned connection between the lower end 58 of support arm 54 and the mounting base 30 is designed to be detachable. As such, the second pin 44 is provided with through holes 60 through which temporary keepers 62 are passed.

Figure 3:
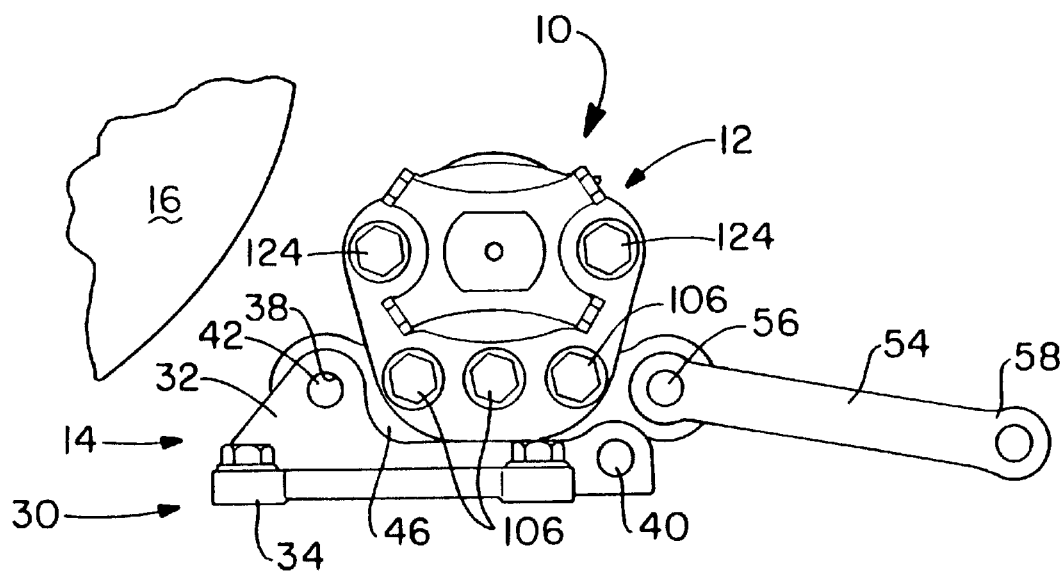
FIG. 3 is a side elevational view of the brake depicted in FIG. 1 in an unfolded position.
Figure 4:
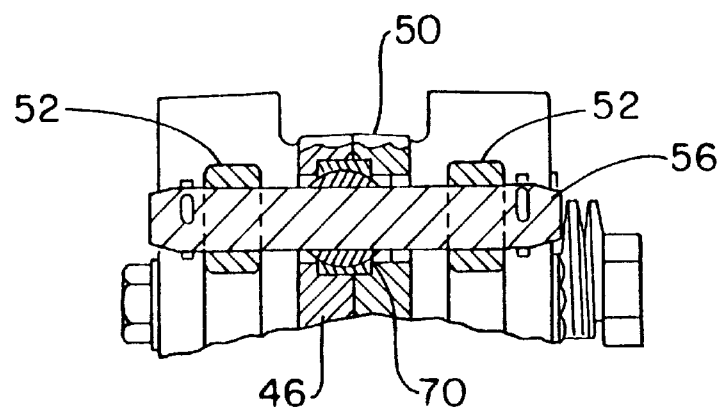
FIG. 4 is a cross sectional view of one of the mounting pins incorporating a spherical bushing that provides a self-aligning feature taken along line 4—4 of FIG. 1.

When a user desires to change a friction pad in the brake 10, the user removes at least one of the keepers 62 and slides the second pin 44 out from between the support arm 54 and the mounting base 30. Once the second pin 44 is removed, the support arm 54 may pivot freely about the third pin 56, and the caliper base 46 may pivot freely about the first pin 42. As such, the caliper base may be rotated downwardly and away from the disk 16 as shown in FIG. 3 to a position where the caliper assembly 12 is free of the disk 16. When the caliper assembly 12 is in this position, the friction pads 142, 242 are easily removed and replaced. Once the new friction pads 142, 242, have been inserted, the user simply rotates the caliper base 46 back upwardly toward the disk 16 until the lower end 58 of the support arm 54 lines up with the second hole 40 in the mounting base 30. The second pin 44 may then be inserted and the keepers 62 replaced. When the pins 42, 44, 56 are in place, the folding triangular base 14 provides a stable and strong support for the caliper assembly 12.

Figure 2:
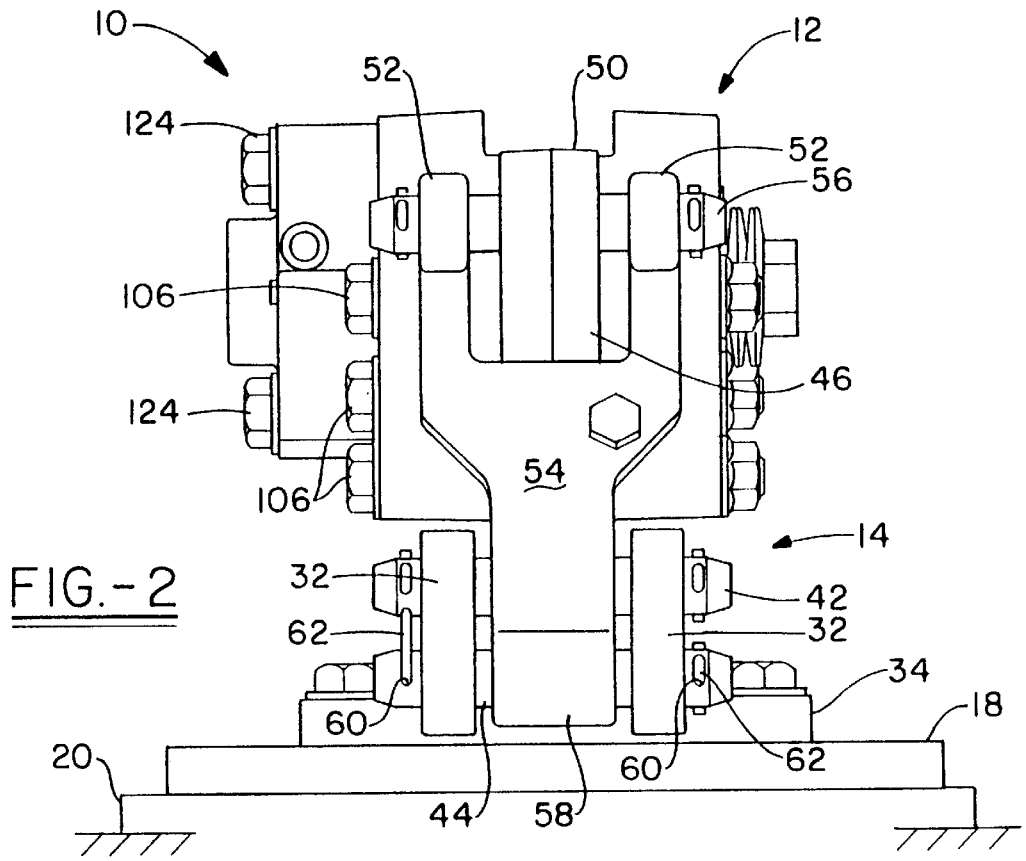
FIG. 2 is an end view of the brake depicted in FIG. 1.

The folding triangular base 14 also allows the caliper assembly 12 to adjust to movement of the disk 16. In a typical situation, the brake disk 16 will move axially. As perhaps best seen in FIG. 2, the caliper base 46 may move axially along the first pin 42 and third pin 56 to accommodate for this axial movement of the disk 16. The caliper base 46 carries spherical bushings 70 that both allows the caliper base 46 to slide axially along the pins 42, 56 and also allows the caliper base 46 to pivot with respect to the pins 42, 56. Allowing the caliper base 46 to both move axially and pivot with respect to the pins 42, 56 causes the brake 10 to self-align with the disk 16 on initial installation thus eliminates the need to manually align the brake 10. This also eliminates the wear-in period on the friction pads 142, 242 before the brake 10 is at full performance.

Now turning to the operation of the caliper assembly 12, it can be understood that the caliper assembly 12 generally includes an active half, indicated generally by the numeral 100, and a passive half, indicated generally by the numeral 102. The active half 100 is generally carried by the active half 46A of the caliper base 46 while the passive half 102 is generally carried by a passive half 46B of the caliper base 46. The halves 46A and 46B are held together by a plurality of bolts 104 that pass through an opening in the halves 46A and 46B. A bolt head 106 at one end of each bolt 104 abuts the base 46 while the threaded end 108 may threadedly engage a nut (not shown) or may threadedly engage a balance plate 110 as depicted in the drawings. The balance plate 110 may be desirable to evenly distribute weight on both sides of the brake 10.

The active half 46A of the caliper base 46 has an active base side plate 112 extending outwardly therefrom. The side plate 112 has a piston opening 114 therein that is configured to slidingly receive at least a portion of a two-part piston assembly 120. A piston cap 122 cooperates with the base 46 to form a piston chamber in which the piston assembly 120 slidingly resides. The piston cap 122 may be connected to the side plate 112 by any of the various methods known in the art, but it has been found useful to connect the cap 122 to the side plate 112 with a plurality of bolts 124. Each bolt 124 engages a threaded bore in the side plate 112 to tightly connect the cap 122 to the side plate 112. The piston cap 122 includes a plurality of hydraulic fittings (not shown) that are used to deliver pressurized hydraulic fluid into the piston chamber to apply the brake 10 and other fittings that allow fluid to be bled from the piston chamber when desired.

The piston assembly 120 includes a first, inner piston 130 and a second, outer piston sleeve 132. The piston 120 is broken into two separate pieces so that a disk or plate spring 134 may be placed on the inner piston 130 for a purpose that will be described in more detail hereinbelow. The inner piston 130 has a plurality of shelves that are connected by a series of steps. The first shelf 140 is inserted into the active friction pad 142. A second shelf 144 has a larger diameter than the first shelf 140 and is connected thereto by a first step 146. The second shelf 144 slidingly receives the outer piston 132 thereon. The outer piston 132 abuts a second step 148 that connects the second shelf 144 to a third shelf 150 such that the outer piston 132 moves toward the disk 16 along with the inner piston 130. The third shelf 150 receives the spring 134 in such a way that the spring 134 moves with the inner piston 130. The spring 134 abuts a third step 152 that connects the third shelf 150 to a fourth shelf 154 that provides a space behind the spring 134. A fourth step 156 connects the fourth shelf 154 to a fifth shelf 158. The fifth shelf 158 engages a self-retracting seal 160 that seals the hydraulic fluid chamber 162. A bearing 164 cooperates with the outer piston 132 to maintain piston alignment.

The opening 114 in the side plate 112 has a smaller diameter than the outer diameter of the spring 134. As such, the spring 134 will engage the side plate 112 when the piston assembly 120 moves sufficiently inwardly toward the disk 16. Such movement occurs as the friction pad 142 wears. When the spring 134 eventually engages the side plate 112, the user feels additional resistance when applying the brake 10 because the user also has to exert force to compress the spring 134. This additional pressure serves as an indicator to the user that the friction pad 142 has worn and that it needs to be serviced.

The inner piston 130 includes a cavity 170 in which a self-activating wear adjuster 172 resides. The self-activating wear adjuster 172 is operable to maintain the location of the piston assembly 120 and the friction pad 142 at a constant distance from the disk 16 while the brake 10 is at rest during the lifetime of the friction pad 142. It is highly desirable to maintain a constant distance between the friction pad 142 and the disk 16 so that the user may apply a constant pedal stroke to apply the brake throughout the life of the brake pad 142. The distance between the pad 142 and the disk 16 is known as the brake gap 174. The constant brake gap 174 is also important so that only a minimal amount of hydraulic fluid is used during the application of the brake 10.

The self-activating wear adjuster 172 generally includes a hardened pin 176 that is press fit into the piston cap 122. The pin 176 frictionally engages a washer 178 such that the washer 178 may slide along the pin 176 upon application of the braking force but generally remains fixed to the pin 176. A sleeve 180 is press fit into the inner piston 130 and surrounds the pin 176. The sleeve 180 has a cavity that receives a retraction spring 182. The retraction spring 182 is disposed between the sleeve 180 and the washer 178. The sleeve 180 is configured such that the end 184 of the sleeve 180 is spaced from the washer 178 a distance 186 that is equal to the brake gap 174 when the brake 10 is in a resting position.

The sleeve 180 also has a threaded portion 190 that is used to assist a user when disassembling the brake 10. The threaded portion 190 allows a user to thread a tool into the sleeve 180 such that the sleeve 180 may be removed from the piston 130.

The inner piston 130 has a shoulder 192 that rests against the washer 178 such that the piston 130 may not move outwardly pass the location of the washer 178. By "outwardly," it is meant that the piston 130 is moving away from the disk 16 and thus the "inward" direction is used to describe when the piston 130, or other parts of the brake 10, are moving toward the disk 16.

Turning now to the passive half 102 of the caliper assembly 12, it can be seen that a passive base side plate 212 extends outwardly from the passive half 46B of the caliper base 46. The side plate 212 has a threaded opening 214 therein that is configured to threadedly receive two-part manual adjustment member 220 that has an outer member 222 and an inner member 224. The inner member 224 is threadedly received by the outer member 222 and the two members 222, 224 are fixed together by a key 226. The key 226 causes the manual adjustment member 220 to rotate as a single unit. Of course, other methods of fixing the inner member 224 to the outer member 222 are also contemplated by the present invention. Such a two-part assembly is desirable so that a plurality of springs 230 may be inserted between the side plate 212 and the inner member 224 to act as lock washers. The springs 230 provide constant force between the side plate 212 and the inner member 224 such that the assembly 220 maintains its position.

The positioning of assembly 220 is important because the assembly 220 carries the passive friction pad 242. In order for the brake 10 to properly function, the passive friction pad 242 must remain close to the disk 16 when the brake 10 is in a resting position. The position of the passive friction pad 242 may be adjusted by rotating the assembly 220 with respect to the side plate 212. When the assembly 220 is rotated, the threads cause the assembly 220 to move inwardly or outwardly depending on the direction of rotation. As such, the distance between the passive friction pad 242 and the brake disk 16 may be adjusted. As explained above, once the position is set, the springs 230 maintain the position.

The brake 10 is activated when a user delivers pressurized hydraulic fluid to the hydraulic fluid chamber 162. As explained in the background of the invention, the delivery of the hydraulic fluid may be accomplished by depressing a pedal that moves a piston. When hydraulic fluid is delivered to the hydraulic fluid chamber 162, force is created between the piston assembly 120 and the piston cap 122. This force causes the piston assembly 120 to move inwardly toward the brake disk 16. The piston assembly 120 continues to move inwardly until the active friction pad 142 closes the brake gap 174 and contacts the brake disk 16. The force causes the caliper assembly 12 to center itself on the disk 16 by sliding on the pins 42, 56. In this position, the force applied by the hydraulic fluid acts as a braking force.

It can be understood that the gap 186 between the sleeve 180 and the washer 178 is closed simultaneously with the closing of the brake gap 174 between the active friction pad 142 and the brake disk 16. When this occurs, the end 184 of the sleeve 180 abuts the washer 178. It can also be understood that when the sleeve 180 abuts the washer 178, the shoulder 192 of the inner piston 130 has lifted off of the washer 178 because the piston assembly 120 has moved inwardly. The shoulder 192 lifts off of the washer 178 because the washer 178 and pin 176 does not move with the piston assembly 120. It can also be understood that when the sleeve 180 abuts the washer 178, the retraction spring 182 has been compressed. In this position, the user is applying braking force by continuing to supply pressurized hydraulic fluid to the hydraulic chamber 162. The friction between the friction pads 142, 242 and the brake disk 16 causes the friction pads 142, 242 to wear and decrease the thickness of the pads 142, 242. As the thickness of the pad 142 decreases, the piston assembly 120 moves further inwardly to compensate for the decrease in thickness. As this occurs, the sleeve 180 which is press fit into the inner piston 130 also moves further inwardly. As such, the sleeve 180 will force the washer 178 along the hardened pin 176 overcoming the frictional connection between the washer 178 and the pin 176. Such movement between the washer 178 and the pin 176 may occur because the frictional connection between the washer 178 and the pin 176 is such that it may be overcome by the braking force but not overcome by the retraction of the piston assembly 120.

Once the washer 178 has been moved inwardly along the pin 176, the initial or resting position of the piston assembly 120 is reset. The reset position is exactly equal to the amount of wear that has occurred on the active friction pad 142. Thus, when the braking force is released, the retraction spring 182 expands between the washer 178 and the sleeve 180 to force the piston assembly 120 outwardly. The spring 182 is sized to be sufficient to overcome the hydraulic pressure in the various lines and devices that deliver hydraulic fluid to the brake 10. The piston assembly 120 is moved outwardly because the washer 178 is essentially fixed to the hardened pin 176 and all of the spring force from the retraction spring 182 is used to move the sleeve 180 and thus the inner piston 130 outwardly. The use of the self-retracting seal 160 is particularly useful in this situation because the friction between the seal 160 and the inner piston 130 does not "resist" the force of the spring 182. As such, a smaller spring 182 may be used to retract the piston assembly 120.

The piston assembly 120 is moved outwardly by the spring 182 until the shoulder 192 of the inner piston 130 engages the washer 178. When this occurs, the outward movement is stopped and the piston assembly 120 is at its new resting position. This process continues and repeats each time the brake is applied until significant wear occurs to the active friction pad 142. It should now be understood that the brake gap or built-in clearance 174 between the friction pad 142 and the brake disk 16 remains constant throughout the piston travel until the spring 134 is engaged.

Figure 5:
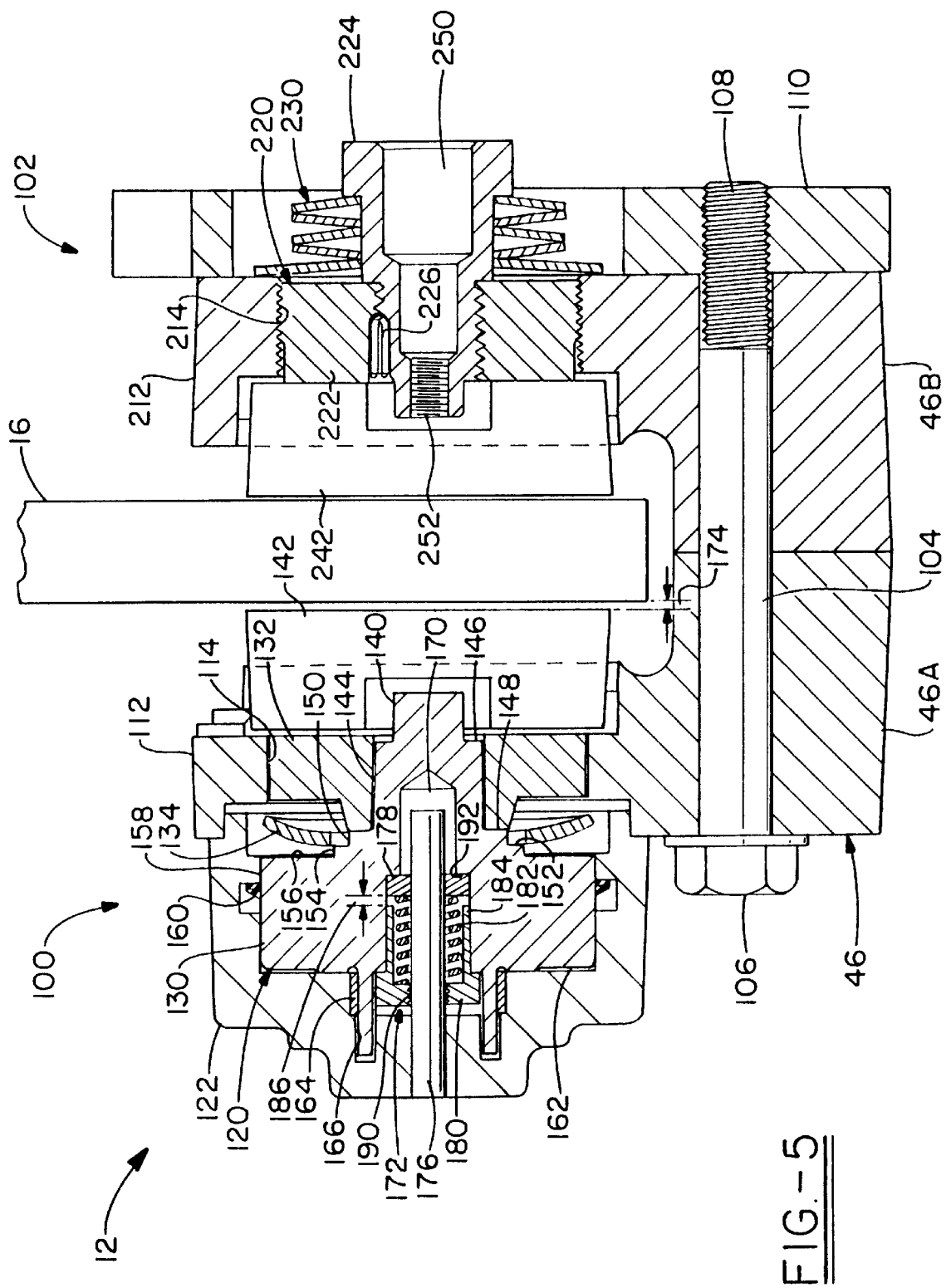
FIG. 5 is a cross sectional view of the caliper assembly taken substantially along line 5—5 of FIG. 1.
Figure 6:
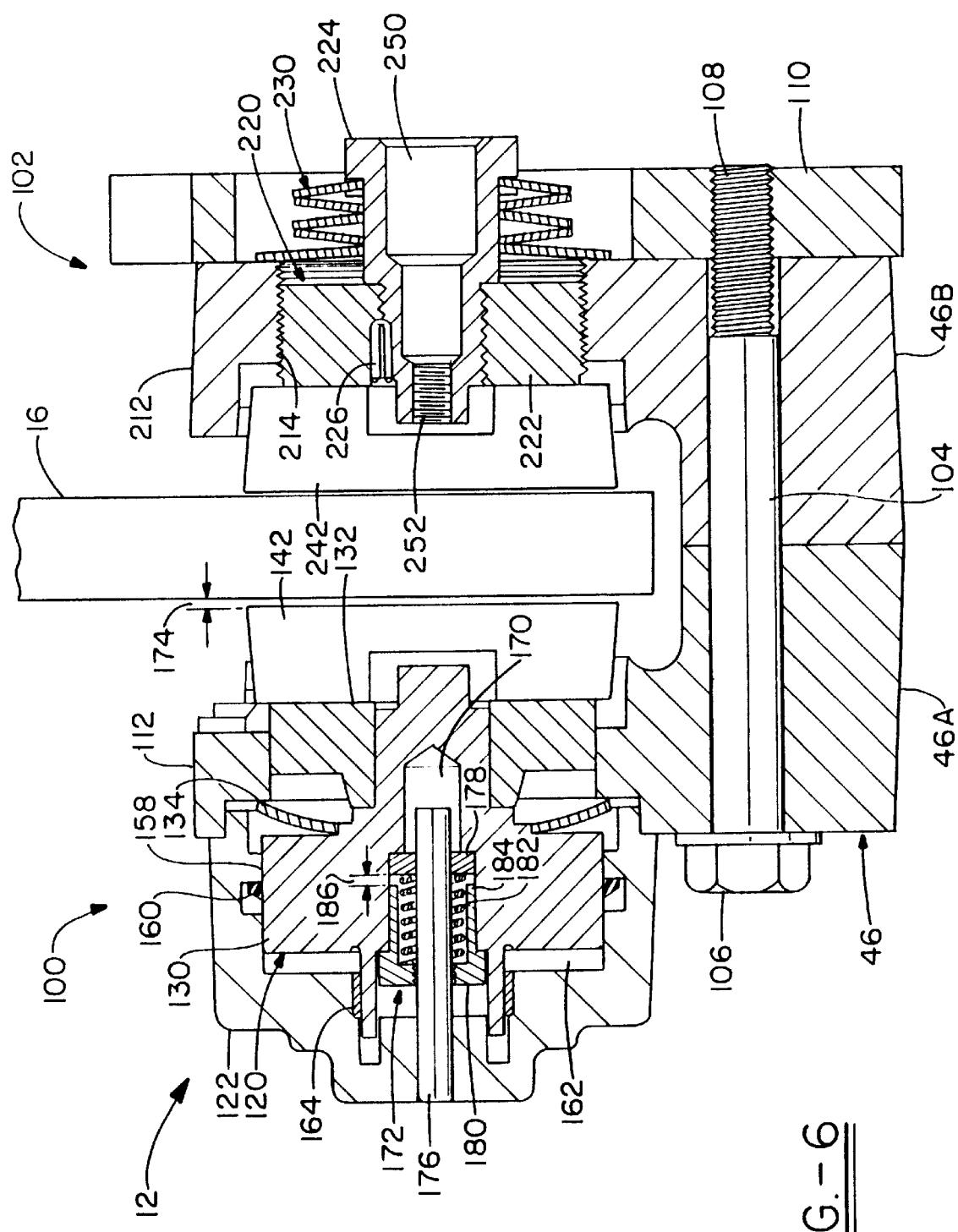
FIG. 6 is a cross sectional view similar to FIG. 5 depicting the caliper assembly after one of the friction pads has been significantly worn.

FIG. 6 depicts the caliper assembly 12 after significant wear has occurred to the active friction pad 142. It can be seen that the washer 178 has moved inwardly along the hardened pin 176, but the brake gap 174 is the same as the brake gap 174 depicted in FIG. 5. It can also be seen in FIG. 6 that the significant wear to the active friction pad 142 has caused the piston assembly 120 to move inwardly such that the spring 134 is just beginning to contact the side plate 112. When the spring 134 contacts the side plate 112, the braking force will have to overcome the spring 134 in addition to applying the friction pad 142 against the brake disk 16. This additional force can be felt by the user and is an indication that the friction pad 142 is significantly worn.

When the user is required to change the friction pads 142, 242, the user inserts a bolt (not shown) into a cavity 250 in the inner manual adjustment member 224. The bolt threadedly engages a threaded portion 252 of the member 224 and is rotated until the bolt contacts the passive friction pad 242. At that time, the user continues to rotate the bolt creating force between the inner member 224 and the friction pad 242 until the friction pad 242 pushes against the brake disk 16. The user continues to rotate the bolt until the force has moved the caliper assembly 12 such that the force acts against the active friction pad 142 until the piston assembly 120 is forced to return to its initial position depicted in FIG. 5. When this occurs, the washer 178 is pushed back along the pin 176 to its initial position. After the piston assembly 120 is reset, the user removes the second pin 44 from the folding triangular base assembly 14 and unfolds the base assembly 14. In the unfolded position, the friction pads 142 and 242 may be easily replaced with new friction pads. The user then rotates the triangular base assembly 14 back to the triangular position and inserts the pin 44 between the base 30 and the support arm 54.

Thus it should be evident that the device and methods of the present invention are highly effective in the hydraulic caliper disk brake for a steel mill crane. The invention is particularly suited for retrofitting hydraulic drum brakes in steel mill cranes, but is not necessarily limited thereto. The device and method of the present invention can be used separately with other equipment, methods and the like.

Based upon the foregoing disclosure, it should now be apparent that the use of the hydraulic caliper disk brake described herein will carry out the aspects set forth hereinabove. It is, therefore, to be understood that any variations evident fall within the scope of the claimed invention and thus, the selection of specific component elements can be determined without departing from the spirit of the invention herein disclosed and described. In particular, the elements of the hydraulic caliper disk brake according to the present invention are not necessarily limited to those having specific elements disclosed in the specification as a preferred embodiment. Thus, the scope of the invention shall include all modifications and variations that may fall within the scope of the attached claims.

What is claimed is:

1. A hydraulically applied caliper disk brake for use with a crane travel device carrying a brake disk, said brake comprising:

a mounting base having a first end and a second end;

a caliper assembly having a caliper base, said caliper base including an upper end and a lower end, said lower end of said caliper base pivotally connected to said first end of said mounting base;

a support arm having an upper end and a lower end, said upper end of said support arm pivotally connected to said upper end of said caliper base, said lower end of said support arm pivotally connected to said second end of said mounting base;

said caliper assembly including a pair of friction pads;

a portion of the brake disk disposed between said friction pads when said lower end of said support arm is connected to said second end of said mounting base;

said caliper assembly pivotable away from the brake disk when said lower end of said support arm is disconnected from said second end of said mounting base such that said friction pads are free of the brake disk.

2. A caliper disk brake according to claim 1, further comprising a first pin forming said pivotal connection between said caliper base and said first end of said mounting base, a second pin forming said pivotal connection between said lower end of said support arm and said second end of said mounting base, and a third pin forming said pivotal connection between said upper end of said caliper base and said upper end of said support arm.

3. A caliper disk brake according to claim 2, further comprising a self-aligning bushing carried by said upper end of said caliper base, said self-aligning bushing engaging said third pin, and a second self-aligning bushing carried by said lower end of said caliper base, said second self-aligning bushing engaging said first pin.

4. A caliper disk brake according to claim 3, wherein said self-aligning bushings enable axial movement.

5. A caliper disk brake according to claim 4, wherein said self-aligning bushings are spherical bearings.

6. A caliper disk brake according to claim 2, wherein said support arm is Y-shaped having two branches at its upper end, said support arm engaging said third pin on either side of said upper end of said caliper base.

7. A caliper assembly for a hydraulically applied caliper disk brake for use with crane travel devices carrying a brake disk, said caliper assembly comprising:

a caliper housing;

a piston slidably carried by said caliper housing; and a spring carried by said piston such that said spring will eventually engage said housing as said piston moves inwardly toward the brake disk;

after said spring contacts said housing, said spring being compressed as said piston moves further inwardly.

8. A caliper assembly according to claim 7, wherein said piston includes an inner piston and an outer piston.

9. A caliper assembly according to claim 8, wherein said spring is carried by said inner piston.

10. A caliper assembly according to claim 7, further comprising a piston cap attached to said caliper housing forming a hydraulic chamber between said piston cap and said piston, and a source of pressurized hydraulic fluid, said hydraulic chamber in selective fluid communication with said source of pressurized hydraulic fluid such that said piston is moved inwardly when pressurized hydraulic fluid is delivered to said chamber.

11. A caliper assembly according to claim 10, further comprising a self-retracting seal carried by said piston cap such that said seal engages said piston and at least partially seals said chamber.

12. A caliper assembly according to claim 11 further comprising a retraction spring that urges said piston outwardly away from the brake disk.

13. A caliper assembly according to claim 7, wherein said spring is a disk spring.

* * * * *